June 2, 1942.  S. B. CRARY  2,285,192
CONTROL EQUIPMENT
Filed Oct. 21, 1941
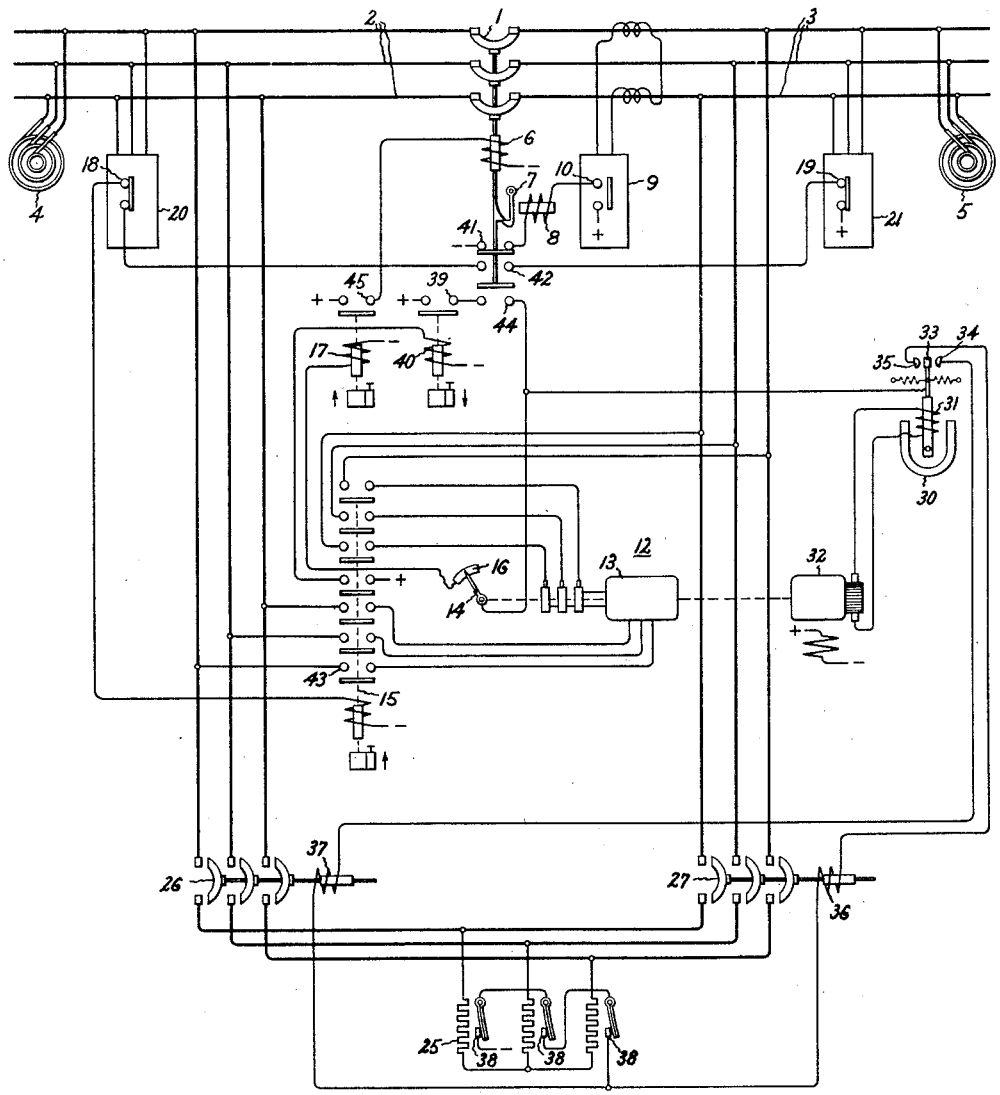
Inventor:
Selden B. Crary,
by Harry E. Dunham
His Attorney.

UNITED STATES PATENT OFFICE 2,285,192

CONTROL EQUIPMENT

Selden B. Crary, Schenectady, N. Y., assignor to General Electric Company, a corporation of New York Application October 21, 1941, Serial No. 415,918

7 Claims. (Cl. 171—97)

My invention relates to control equipments and particularly to an equipment for controlling the relative frequencies of the two alternating current circuits when they are disconnected from each other so as to maintain the frequency difference at such a low value, while they are disconnected, that the two circuits can pull into step when they are reconnected to each other.

An object of my invention is to provide an arrangement of apparatus for connecting to the alternating current circuit having the higher frequency, when the two circuits are disconnected from each other, a predetermined load so as to maintain the frequency difference at a sufficiently low value to cause the two circuits to pull into step when they are reconnected together.

My invention will be better understood from the following description when taken in connection with the accompanying drawing the single figure of which diagrammatically illustrates an embodiment of my invention in connection with an automatic reclosing arrangement for a circuit breaker interconnecting two energized alternating current circuits, and the scope of my invention will be pointed out in the appended claims.

In the accompanying drawing, 1 represents a circuit breaker interconnecting two alternating current circuits 2 and 3, respectively energized by suitable sources of current 4 and 5. As shown, the circuit breaker 1 is of the well known latch closed type comprising a closing coil 6, a latch 7 for holding the circuit breaker 1 in its closed position, and a trip coil 8 for releasing the latch 7. Any suitable protective means, examples of which are well known in the art, may be provided for effecting the energization of the trip coil 8 in response to an out of step or fault-condition. Since the details of such protective means form no part of my present invention, I have represented such means by a rectangle 9 containing contacts 10 which, when closed, complete an energizing circuit for the trip coil 8.

For controlling the energization of the closing coil 6 when the circuit breaker 1 is open, I provide, in accordance with my invention, a rotatable device 12 which, when operative, changes its position in accordance with the phase displacement of the voltages of the circuits 2 and 3. As shown, the rotatable device 12 comprises a dynamoelectric machine 13 driving a rotatable contact 14. The dynamoelectric machine 13 has a polyphase winding on its rotor and a polyphase winding on its stator which are arranged to be connected respectively to the circuits 2 and 3 by a relay 15. Therefore, when both of the windings of the dynamoelectric machine 13 are energized, the position of the rotatable contact 14 varies in accordance with the phase angle displacement of the voltages of the circuits 2 and 3. For the purpose of this description, it is assumed that the device 12 is so constructed that the rotatable contact 14 makes one complete revolution while a 360° phase displacement is occurring between the voltages of the circuits 2 and 3, i. e. during each slip cycle.

Associated with the rotatable contact 14 is a stationary contact 16 which is so located in the path of movement of the rotatable contact 14 that the contacts 14 and 16 are in engagement during a predetermined range of phase angle displacement of the voltages of the circuits 2 and 3. For example, in the particular embodiment shown in the drawing, it will be assumed that the contact 16 is so constructed that the rotatable contact 14 is in engagement therewith when the voltage of the circuit 2 leads or lags the voltage of the other circuit less than 30°. While I have shown only one stationary contact 16 it will be obvious that any desired number of stationary contacts may be provided and spaced in the path of movement of the contact 14 in the manner disclosed and claimed in my copending application SN 411,282 filed Sept. 18, 1941.

A relay 17 is connected to the stationary contact 16 so that it is energized when the contacts 14 and 16 are in engagement and the circuit breaker 1 is open. The relay 17 is of the well known type which does not pick up until after it has been energized for a predetermined time.

For the purpose of this description, it will be assumed that, when the voltage of the circuit 2 leads or lags the voltage of circuit 3 less than 30°, it is desirable to reclose the circuit breaker 1 only in case the frequency difference is also 4 cycles per second or less. Therefore, in the arrangement shown the time delay of the relay 17 is adjusted so that it picks up when continuously energized for approximately $\frac{1}{24}$ of a second.

In order to prevent the phase angle displacement responsive device 12 from effecting a reclosure of the circuit breaker 1 in case the voltages of the circuits 2 and 3 are too low or the phase rotations thereof are reversed with respect to each other, I provide in the energizing circuit of the operating coil of the relay 15, the series connected contacts 18 and 19 of suitable voltage rotation and phase balance relays 20 and 21 respectively connected to the circuits 2 and 3.

When the circuit breaker 1 opens, it effects a reduction in the load on one of the circuits 2 and 3, depending upon which circuit is supplying power to the other through the circuit breaker 1 prior to the opening thereof, and increases the load on the sources connected to the other circuit. These changes in load, when the circuit breaker 1 opens, tend to cause an increase in the frequency of the circuit on which the load is decreased and a decrease in the frequency of the other circuit, and this change in frequency may occur so rapidly that the circuit breaker 1 cannot be reclosed before the frequency difference has increased to such a value that the two circuits cannot pull into step when the circuit breaker 1 is reclosed. In order to prevent the frequency difference from becoming too large, when the circuit breaker 1 is open, I provide a resistor 25 which is arranged to be connected across the circuit 2 by suitable switching means 26 and across the circuit 3 by suitable switching means 27 and means for selectively controlling the closing of the switching means 26 and 27 when the circuit breaker 1 is opened so that the resistor 25 is connected across the circuit having the higher frequency. In the particular embodiment of my invention shown in the drawing, the selective operation of the switching means 26 and 27 is effected by a polarized relay 30, the operating winding 31 of which is energized by a separately excited direct current generator 32 driven by the dynamoelectric machine 13. The polarized relay 31 is arranged in any suitable manner so that its movable contact 33 cannot engage either of its stationary contacts 34 and 35 until the voltage of the generator 32 is above a predetermined value. Since the dynamoelectric machine 13, when in operation, rotates at a speed proportional to the frequency difference of the circuits 2 and 3 and in a direction which depends upon which of these two circuits has the higher frequency, it is evident that the movable contact 33 of the relay 30 cannot engage the contact 34 until the frequency of one of the circuits 2 and 3 exceeds the frequency of the other circuit more than a predetermined amount and cannot engage the other stationary contact 35 until the frequency of said one of the circuits is below the frequency of the other circuit more than a predetermined amount. In the particular arrangement shown, it is assumed that the relay 30 is so designed that the contact 33 engages the stationary contact 34 when the frequency of the circuit 2 exceeds the frequency of the circuit 3 and the frequency difference is more than 4 cycles per second and that the contact 33 engages the stationary contact 35 when the frequency of the circuit 3 exceeds the frequency of the circuit 2 and the frequency difference is more than 4 cycles per second. The engagement of the contacts 33 and 34 completes an energizing circuit for the operating coil 37 of the switching means 26, and the engagement of the contacts 33 and 35 completes an energizing circuit for the operating coil 36 of the switching means 27.

In order to prevent the resistor 25 from becoming too hot while in service, the energizing circuits of the operating windings 36 and 37 also include the normally closed contacts 38 of a suitable thermal responsive device associated with the resistor 25. The contacts 38 are arranged to be opened when the temperature of the resistor exceeds a predetermined value.

Also in order to prevent the operation of the switching means 36 and 37 and the relay 17 until after the phase angle displacement responsive device 12 has had time to assume its proper position in accordance with the phase displacement of the voltages of the circuits 2 and 3, after the circuit breaker 1 opens I provide, in the respective energizing circuits of the operating coils 36 and 37 and the relay 17, the contacts 39 of a time relay 40 which is arranged to be energized in response to the operation of the control relay 15.

The operation of the arrangement shown in the drawing is as follows:

When a fault or out of step condition occurs, which causes the protective means 9 to close its contacts 10, an energizing circuit is completed for the trip coil 8 through the auxiliary contacts 41 on the circuit breaker 1 so as to effect the opening thereof.

If the voltages of the circuits 2 and 3 are above predetermined values and the phase rotations thereof are correct so that the contacts 18 and 19 of the relays 20 and 21, respectively, are closed, the auxiliary contacts 42 on the circuit breaker 1 complete an energizing circuit for the control relay 15 which connects the windings of the dynamo-electric machine 13 to the circuits 2 and 3 so that the position of the rotating contact 14 depends upon the phase displacement of the voltages of the circuits 2 and 3, and the speed at which this contact 14 rotates is proportional to the frequency difference of the two circuits 2 and 3. The closing of the contacts 43 of the relay 15 completes an energizing circuit for the time relay 40.

When the frequency difference is 4 cycles per second or less, the rotating contact 14 remains in engagement with the stationary contact 16 long enough during each slip cycle to pick up the relay 17. Therefore, if the frequency difference is 4 cycles per second or less, when the time relay 40 closes its contacts 39, a circuit is completed for the time relay 40 through the auxiliary contacts 44 on the circuit breaker 1 and the contacts 14 and 16 for sufficient length of time to cause the relay 17 to close its contacts 45. The closing of the contacts 45 of relay 17 completes an energizing circuit for the closing coil 6 so as to effect a reclosure of the circuit breaker 1.

If, however, the frequency difference is more than 4 cycles per second, when the time relay 40 closes its contacts 39, the above described energizing circuit for the time relay 17 is not completed for a sufficient length of time during each slip cycle to pick up the relay 17. However, when the frequency difference is more than 4 cycles per second, the operating winding 31 of the polarized relay 30 is sufficiently energized to cause the movable contact 33 to engage either the stationary contact 34 or the stationary contact 35 depending upon the relative frequencies of the circuits 2 and 3. If the frequency of the circuit 2 is higher than the frequency of the circuit 3, the contact 33 of the relay 30 engages the stationary contact 34 so that an energizing circuit is completed for the operating winding 37 of the switching means 36 through the contacts 39 of the relay 40 the auxiliary contacts 44 on the circuit breaker 1 and the thermally controlled contacts 38. The operation of the switching means 26 effects the connection of the resistor 25 to the circuit 2 so as to decrease the frequency of the circuit 2 sufficiently to reduce the frequency difference to less than 4 cycles per second, and thereby render the relay 17 operative in the manner heretofore described to effect a reclosure of the circuit breaker 1.

If the frequency of the circuit 3 is higher than the frequency of the circuit 2, the movable contact 33 of the polarized relay 30 engages the stationary contact 35 and completes an energizing circuit for the operating winding 36 of the switching means 27 through the contacts 39 of the relay 40, the auxiliary contacts 44 on the circuit breaker 1 and the thermally controlled contacts 38. The operation of the switching means 27 connects the resistor 25 to the circuit 3 so as to decrease the frequency thereof sufficiently to reduce the frequency difference below 4 cycles per second. The time relay 17 then operates in the manner heretofore described to effect a reclosure of the circuit breaker 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim is new and desire to secure by Letters Patent of the United States is:

1. In combination, two interconnected independently energized alternating current circuits, protective means for disconnecting said circuits from each other, a load, and means responsive to the relative frequencies of said circuits when disconnected from each other for connecting said load to the circuit having the higher frequency.

2. In combination, two interconnected independently energized alternating current circuits, protective means for disconnecting said circuits from each other, a load, and means responsive to a difference in the frequencies of said circuits in excess of a predetermined value when said circuits are disconnected for connecting said load to the circuit having the higher frequency.

3. In combination, two interconnected independently energized alternating current circuits, protective means for disconnecting said circuits from each other, a load, means for reconnecting said circuits together when the frequency difference of said circuits is below a predetermined value, and means responsive to a frequency difference of said circuits above a predetermined value for connecting said load to the circuit having the higher frequency.

4. In combination, two interconnected independently energized alternating current circuits, protective means for disconnecting said circuits from each other, a load, a separately excited direct current generator, means for driving said generator at a speed proportional to the frequency difference of said circuits when disconnected from each other, and means responsive to the voltage of said generator for effecting the connection of said load to one of said circuits.

5. In combination, two interconnected independently energized alternating current circuits, protective means for disconnecting said circuits from each other, a load, a separately excited direct current generator, means for driving said generator at a speed proportional to the frequency difference of said circuits when disconnected from each other, and means controlled by the voltage of said generator for effecting the connection of said load to the circuit having the higher frequency.

6. In combination, two interconnected independently energized alternating current circuits, protective means for disconnecting said circuits from each other, a load, a separately excited direct current generator, means for driving said generator at a speed proportional to the frequency difference of said circuits when disconnected from each other, and in a direction dependent upon the relative frequencies of said circuits, a polarized relay energized by said generator, and switching means selectively controlled by said relay for connecting said load to the circuit having the higher frequency.

7. In combination, two interconnected independently energized alternating current circuits, protective means for disconnecting said circuits from each other, a load, a separately excited direct current generator, means for driving said generator at a speed proportional to the frequency difference of said circuits when disconnected from each other, and in a direction dependent upon the relative frequencies of said circuits, a polarized relay energized by said generator, switching means selectively controlled by said relay for connecting said load to the circuit having the higher frequency, and means for rendering said switching means inoperative when the temperature of said load exceeds a predetermined value.

SELDEN B. CRARY.